(12) United States Patent
Leonardi et al.

(10) Patent No.: US 11,908,051 B2
(45) Date of Patent: Feb. 20, 2024

(54) IMAGE PROCESSING SYSTEM AND METHOD FOR GENERATING IMAGE CONTENT

(71) Applicant: Sony Interactive Entertainment Inc., Tokyo (JP)

(72) Inventors: Rosario Leonardi, London (GB); Michael Eder, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 196 days.

(21) Appl. No.: 17/077,375

(22) Filed: Oct. 22, 2020

(65) Prior Publication Data
US 2021/0133478 A1 May 6, 2021

(30) Foreign Application Priority Data
Oct. 31, 2019 (GB) ...................................... 1915812

(51) Int. Cl.
*G06T 11/40* (2006.01)
*G06T 7/90* (2017.01)
*G02B 27/01* (2006.01)

(52) U.S. Cl.
CPC ............ *G06T 11/40* (2013.01); *G02B 27/017* (2013.01); *G06T 7/90* (2017.01)

(58) Field of Classification Search
CPC .......... G06T 10/56; G06T 10/50; G06T 7/90; G02B 27/017
USPC ........................................................ 382/165
See application file for complete search history.

(56) References Cited

U.S. PATENT DOCUMENTS

| 5,222,154 A * | 6/1993 | Graham | .................... H04N 1/62 |
| | | | 382/269 |
| 6,252,989 B1 | 6/2001 | Geisler | |
| 2012/0163712 A1* | 6/2012 | Nakajima | ............... G06T 7/194 |
| | | | 382/165 |
| 2017/0263046 A1 | 9/2017 | Patney | |
| 2019/0164313 A1* | 5/2019 | Ma | ....................... G06K 9/6218 |

FOREIGN PATENT DOCUMENTS

EP 3816941 A1 5/2021

OTHER PUBLICATIONS

Andrew T. Duchowski, et al., "On Spatiochromatic Visual Sensitivity and Peripheral Color LOD Management" ACM Transactions on Applied Perception, vol. 6, 2, Article 9, 18 pages, Feb. 1, 2009.
"On Spatiochromatic Visual Sensitivity and Peripheral Color LOD Management" ACM Transactions on Applied Perception, vol. 6, 18 pages, 2009.
Combined Search and Examination Report for corresponding GB Application No. GB1915812.0, 7 pages, dated Aug. 7, 2020.

(Continued)

*Primary Examiner* — Gabriel I Garcia
(74) *Attorney, Agent, or Firm* — Matthew B. Dernier, Esq.

(57) ABSTRACT

A system for generating image content, the system comprising an image region identification unit operable to identify one or more regions of an image to be displayed as low-detail regions, an image processing unit operable to perform processing to reduce colour differences for each of one or more areas within one or more of the identified regions, and an image output unit operable to output one or more processed images.

14 Claims, 3 Drawing Sheets

(56) References Cited

OTHER PUBLICATIONS

"On Spatiochromatic Visual Sensitivity and Peripheral Color LOD Management" ACM Transactions on Applied Perception, vol. 6, 18 pages, 2009 (abstract only).
Extended European Search Report for corresponding EP Application No. 20202341.2, 7 pages, dated Mar. 29, 2021.
Examination Report for corresponding application No. GB1915812.0, 2 pages, dated Jul. 22, 2022.

* cited by examiner

IMAGE PROCESSING SYSTEM AND METHOD FOR GENERATING IMAGE CONTENT

BACKGROUND OF THE INVENTION

Field of the Invention

This disclosure relates to an image processing system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, the demand for high-quality video and video game content has increased. This is driven in part by the demand for immersive content, such as content for display with a virtual reality (VR) headset, as well as the fact that high-quality displays are more widespread amongst consumers. However, the provision of such content is associated with the requirement for ever-increasing processing power—and this may be problematic when using hardware that is not updated frequently (such as a games console) or is limited in processing power due to other considerations such as cost or portability. The provision of suitably immersive VR content in particular is associated with expensive image processing operations.

It is therefore considered that rather than relying on an increase in the capabilities of the hardware used to generate and provide such content, it may be preferable to optimise the content and/or the content generation process. By optimising the content and/or content generation process, it is anticipated that the amount of processing power that is required is reduced or the quality of content is improved while utilising the same amount of processing power. That is, the ratio of content quality to required processing power may be improved by the optimisation.

One such technique is that of foveal rendering. This comprises the rendering of images for display such that a particular focal area is provided with a higher quality than those areas of the image outside that focal area. The focal area may be determined based upon in-content cues and/or eye gaze tracking (or a prediction of the user's likely gaze position) within the image display area.

The difference in image quality is usually reflected in the reduction of the image resolution in the non-focal areas relative to the focal areas, reducing the resolution of the image as a whole. This can result in a substantial saving in the amount of processing required to generate images for display.

Similar methods may also be considered for non-VR content, or for content display systems in which eye tracking is not available—such content is also a suitable candidate for optimisation, rather than being limited to only gaze-dependent foveal rendering.

It is therefore considered that alternative or additional optimisations may be appropriate in the context of generating images for display.

It is in the context of the above problems that the present disclosure arises.

SUMMARY OF THE INVENTION

This disclosure is defined by claim 1.

Further respective aspects and features of the disclosure are defined in the appended claims. It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

As discussed above, one method of optimising the process of generating content for display is to selectively modify the image quality in different regions of the display image. For example, foveal rendering schemes provide for a method by which the image quality is to be lowered in areas of low visual impact. This can enable a reduction in the processing burden of the image generation process, or the generation of higher-quality content (as judged by a viewer) using the same amount of processing resources.

Flexible scale rasterization (FSR) is an example of a method by which image content may be generated using a varying rasterization rate for different areas of the image content, with the rate being dependent upon the position of each area within the image content.

Figure 1:
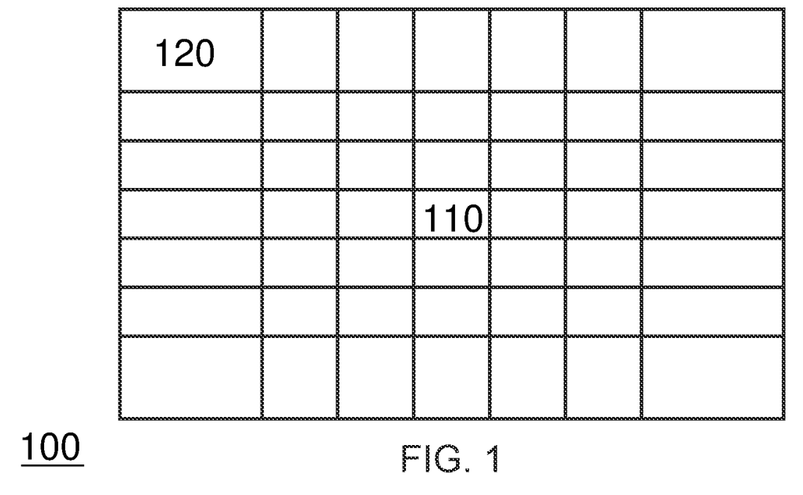
FIG. 1 schematically illustrates a flexible scale rasterization pattern.

For example, FIG. 1 schematically illustrates a visualisation of an FSR encoding scheme to be applied to image generation. The area 100 represents the display screen (referred to as the window space), and it comprises a number of sub-areas such as the sub-areas 110 and 120. Each of the sub-areas represents a respective one of a plurality of same-sized areas of the raster space; that is, the rasterization process provides an equal level of detail for each of the sub-areas shown in FIG. 1. As a result, sub-areas having different sizes will have different display resolutions.

In particular, those areas which are smallest in the window space will have the highest level of detail—and the sub-area 120 will have a higher level of detail than the sub-area 110.

Figure 2:
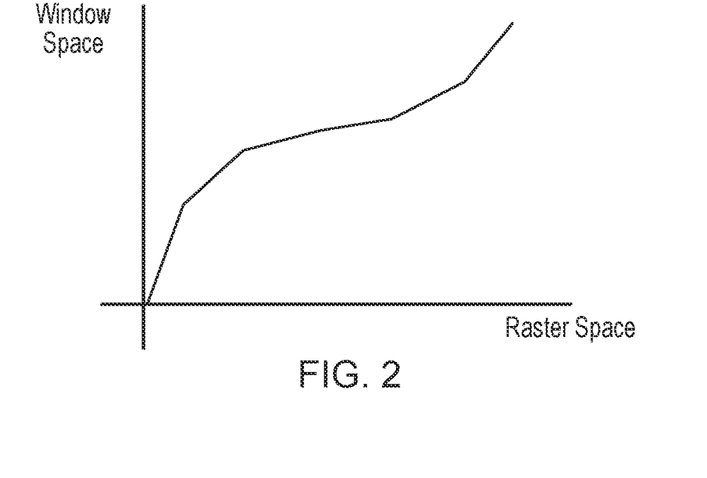
FIG. 2 schematically illustrates a function defining a parameter for flexible scale rasterization.

FSR may be implemented by defining a function for each axis (horizontal and vertical) that describes the correspondence between window space and raster space for that axis. FIG. 2 schematically illustrates an example of such a function.

In FIG. 2, the horizontal axis represents the raster space while the vertical axis represents the window space. A curve, formed by a number of straight-line segments, identifies a mapping between the two spaces in a given dimension—of course, a pair of such functions is required to define a mapping for an area. A steeper segment indicates a greater representation of the window space for a given amount of raster space (that is, a lower-resolution area), while a less-steep segment indicates that the given raster space corresponds to a smaller amount of the window space (that is, a higher-resolution area).

In some cases, it is considered that more than two functions may be defined as appropriate, for example so as to generate a more complex distribution of high-/low-resolution areas. In some embodiments, a smoothing is applied to the curve defined by the straight-line segments so as to reduce the appearance of sharp changes in rendering quality.

The generation of these functions may be performed in a number of ways—for example, in dependence upon eye-tracking data for a viewer, in dependence upon one or more elements of the content itself, and/or the properties of a display device for viewing the content. Any method of generating the functions may be considered appropriate, so long as it is possible to identify which regions of the display area should be higher-/lower-quality respectively.

For instance, eye-tracking data may be used to identify which parts of the display (or the content) are of interest to a user, or are being viewed by the user. For example, a display location may be identified, or one or more content elements, that a viewer is focused on. The two (or more) functions should then be defined so as to indicate a lower representation of window space for a given raster space in the area of focus/interest—that is, the function should have less-steep segments at this point.

In the example of defining functions in dependence upon one or more elements of the content itself, it is considered that some objects may be considered to be intrinsically of greater interest than other objects. For example, the protagonist within a computer game (in a third-person view) may be considered to be an element that should be displayed using a high quality representation.

There are a number of properties of a display device for viewing the content that may also (or instead) be considered when identifying image regions that should be rendered with a lower quality. For example, the display may comprise regions with different resolutions, or some parts of the display may not be able to be focused on by a user due to their location (such as a screen or screen area that occupies the user's peripheral in a head-mountable display device).

Figure 3:
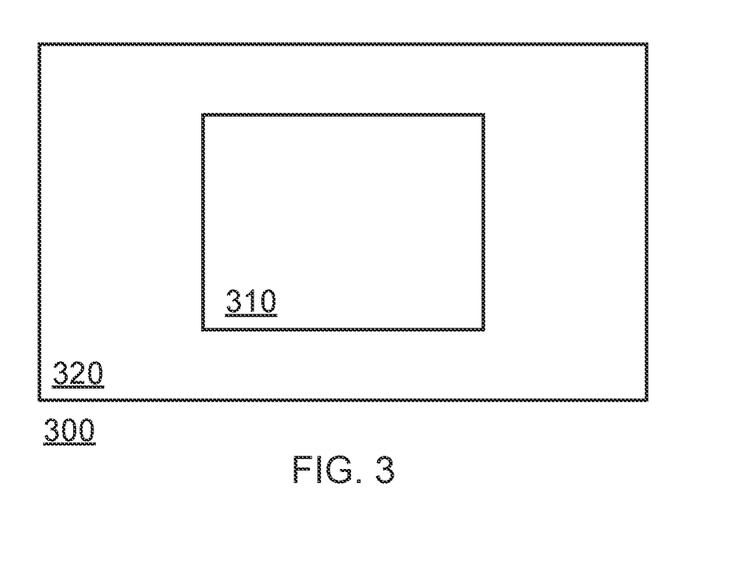
FIG. 3 schematically illustrates a display rendered using flexible scale rasterization pattern of FIG. 1.

FIG. 3 schematically illustrates an example of a screen that displays an image generated according to the FSR encoding scheme of FIG. 1. The screen 300 comprises a high-quality area 310 and a low-quality area 320, with these of course being relative terms rather than placing any absolute limitations on the display properties in each of the areas.

In addition to, or instead of, the varying resolution and/or image quality for content to be displayed, embodiments of the present disclosure provide a method by which processing is performed to vary the colours in one or more regions of an image to be displayed. This processing may be performed as a part of an image rendering process (for example, as a part of a video game), or may be performed on images that have already been generated—for example, upon frames of a movie or other video content.

One example of such processing is that of applying a filter to the image content so as to increase the uniformity of the colours within a particular image area. A number of examples of implementations of such features are discussed below for exemplary purposes, but these should not be considered to be limiting—the purpose of the filter in making the colour more uniform within an image area is the aspect that should be considered. The application of such a filter may be advantageous in that the compression of the image content may be improved, for example, and a number of other improvements to the display may be achieved.

Such a filter may be implemented in any suitable manner so as to achieve the aim of increasing the colour uniformity in an area of a displayed image. For example, an average colour value within that area may be determined, and the colour value for each of the pixels (or each of the pixels that exceed a threshold difference from the average) is adapted to take the value of the average. That is, a suitable process may be operable to determine a representative colour value for an area and to perform processing so as to cause the colour value of one or more elements within that area to more closely align with that representative colour value.

As noted above, this representative value may be an average colour value for an area—this is an example of a statistical derivation of a representative colour value. Alternatively, or in addition, a more contextual analysis may be performed so as to determine a representative value. For example, an identification of an object (or a class of object) may be performed, and a representative colour associated with that object may be selected (for example, from a lookup table) for the area. Of course, this is a simplified example; in practice it may be considered that lighting and environmental factors may be considered in addition to the object identity.

In some cases, the representative colour may be selected so as to provide a desired visual effect. For instance, if the representative colour is determined to be a vivid or otherwise distracting colour (such as luminous yellow, or the only red object in a green environment) the representative colour may be modified so as to reduce the visual impact (such as softening colours, or making them more similar to the background) of the object with that colour. This may be appropriate for objects in the user's periphery, for example, which may in some cases be considered to be of low relevance (as the user is not paying attention to them) and as such the use of distracting colours may be undesirable. Of course, the inverse situation (in which a representative colour may be selected for increased visibility) is also considered.

As a further example of a visual effect, in some contexts it is considered appropriate to add an artificial colouring to one or more areas of a display. For instance, colours may be modified as part of a heads-up display or other graphical user interface—and the representative colour may be selected so as to comply with such a display scheme. Similarly, in some cases a colour grading effect may be applied to content so as to change the viewer's perception of the content—this may be another scenario in which the representative colour may be selected to be different to the original colour (or colours) of the area.

Colour uniformity may be measured using any suitable metric—one example is that of determining the RGB colour value (or the colour value in any other colour space) for each pixel in an area, and determining what proportion of the pixels exceed a threshold deviation from the average values in that area. Of course, a number of different methods of measuring the uniformity of the colour within an area of an image can be envisaged and may be selected freely by the skilled person.

Figure 4:
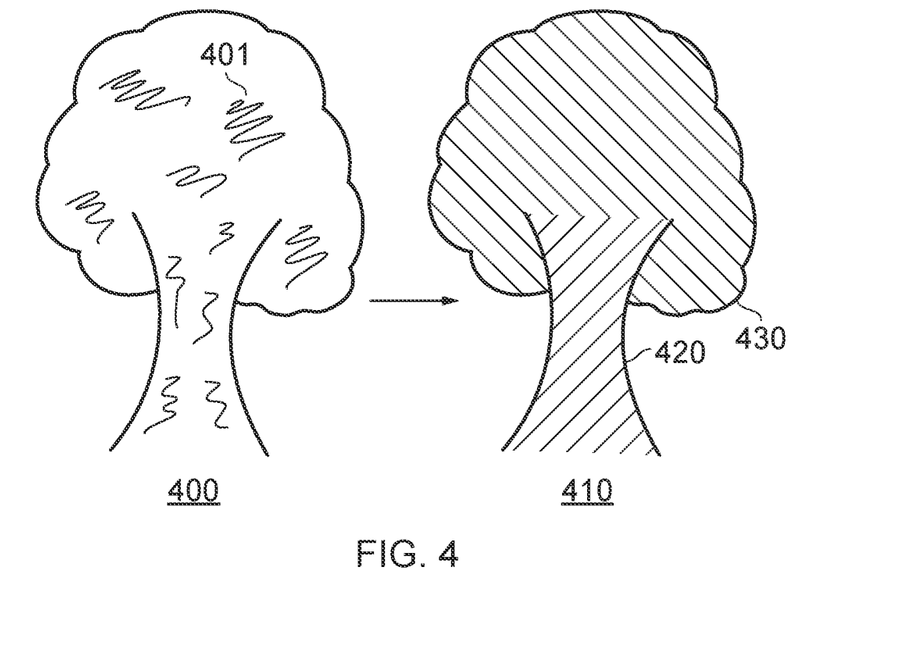
FIG. 4 schematically illustrates an increase in colour uniformity.

FIG. 4 schematically illustrates an example of increasing the uniformity of colours within an image.

In this example, the tree 400 is shown with a plurality of squiggles 401 (that is, curved line segments) that each indicate a portion of the tree that has a colouring that differs from one or more of the other areas indicated by the line segments 401 and/or the background (that is, the parts of the tree 400 that do not have the line segments 401). The varying colours are indicated for both the trunk portion and the leaves portion of the tree.

The tree 410 shows the same object, but after processing is performed to increase the uniformity of the colours. The tree 410 shows a first uniform colour area 420 corresponding to the trunk of the tree, and a second uniform colour area 430 corresponding to the leaves. Here, uniform colour means that the colours are identical within each area 420 and 430, or are within a threshold deviation. While the regions in which the uniform colours are defined may be selected freely, here they are indicated as corresponding to the two dominant colours (brown and green for the trunk and leaves respectively) in the image. The application of the process for increasing the uniformity of colours within an image may be implemented in any suitable manner. A number of examples are discussed below.

A first example is that of dividing the display area into a number of different sub-areas that are each considered in isolation. For example, the display area may be divided into a plurality of ten-by-ten pixel blocks (or any other suitable size, or shape) that cover the whole (or at least a portion of) the display area. Processing may be performed to identify a representative colour for this sub-area, and then further processing can be performed to ensure that each of the pixels within the sub-area represent this colour (or at least approximate it, as appropriate) in line with the above discussion.

Of course, more complex algorithms for performing such a process may be envisaged; for instance, processing may be performed to identify sub-areas in which colour modification should not be performed. This may include the identification of sub-areas in which a large range of colours are used (such that an average or representative colour is not appropriate for each of the colours in the sub-area), or sub-areas which comprise boundaries between objects or colour areas (as identified using edge detection applied to the display area or one or more sub-areas, for example). Another example is that of an algorithm in which once representative colours have been identified for a plurality of sub-areas, processing is performed so as to group adjacent sub-areas which have the same or at least a similar (for example, within a threshold colour variation) representative colour. The colour uniformity increasing process may then be performed for groups of sub-areas, rather than strictly on a per-sub-area basis.

A second example of a process for increasing the uniformity of colours within an image is that of performing the processing on a per-object basis. This may of course include examples in which portions of objects are considered—such as the division of a tree into 'leaves' and 'trunk' sections.

In such an example, objects may be identified in any suitable manner. For instance, objects may be identified using image recognition based methods, such as edge detection to identify an object silhouette and object recognition to identify an object based upon the silhouette shape. Objects may also be able to be identified based upon characteristic colours, or may be labelled using metadata associated with the content.

Once an object, or portions of an object, has been identified processing is performed to increase the uniformity of the colours representing that object. Any of the processes described above may be utilised. It is also considered that in any method in which objects are identified, a target colour may be identified for use as the representative colour. This may either be used as the representative colour, or used to bias or otherwise weight the determination of the representative colour such that the representative colour determination process tends towards a colour that approximates the target.

In a related exemplary processing method, processing may be performed so as to increase the uniformity of colours on the basis of whether or not the display area corresponds to a particular object or group of objects. For example, the object (or group of objects) may be selected in dependence upon contextual considerations, location within the display environment, or user interest/focus. In each of these examples, the processing so as to cause the colours to be more uniform may be implemented in line with any of the methods described above—for example, sub-areas may be defined (or operated on) only in display areas not comprising selected objects.

For example, an object or character within a game or other content may be identified as being of contextual importance by virtue of being user-controllable, significant to a storyline or other scenario, or otherwise important. This may be determined based on associated metadata, for example, game data, or a predetermined set of rules for evaluating the relevance of a displayed object to the scene. In this way, processing to render the colours more uniform is not implemented for important objects, which may mean that a decrease in the display quality is less noticeable to a viewer.

Similarly, objects may be selected based upon their location within the scene. This may be implemented in a number of ways; for example, objects that are present within a specific depth range or within a central (or other focal display) area of the display screen may be selected as being important and thereby excepted from colour uniformity increasing processing. That is, the uniformity of colours may be increased only in the foreground, background, and/or peripheral regions of the image as appropriate.

In another instance of such a method, the objects are selected so as to correspond to user interest or focus. This can be determined based upon gaze-tracking, for example, or information about user preferences or inputs that can be used to identify a likely object of interest. Of course, such an approach may also be implemented without using the object-based approach—instead, an area of interest (for example, corresponding to a plurality of sub-areas as discussed above) may be identified and the processing may be performed in dependence upon whether a sub area belongs to the area of interest or not.

In some embodiments, the process may include an image distance dependence. For example, the tolerance for colour uniformity may decrease as the distance from the centre of the display or an object/area of interest in the image increases. That is, the colours in an image may be more heavily modified in regions that are further from the user's focus. This may be implemented by reducing the threshold for colour deviation in a sub-area, for example, or by using larger sub-areas or the like for performing the processing.

A further example of a process that may be implemented is that of determining sub-areas for the colour uniformity processing by identifying parts of an image which already exhibit a high (or at least relatively high) degree of colour uniformity. This may include embodiments in which contiguous sub-areas of a high colour uniformity are grouped, or it may include examples in which grouping of any regions which show a similar colour and a high degree of colour uniformity. Of course, in some cases the threshold for colour uniformity may be omitted in favour of simply identifying sub-areas of a similar colour.

The above description provides for a number of different methods for increasing the colour uniformity within an image, or within each of one or more regions of an image. Each of these may be utilised alone, or in combination with one or more other processes as appropriate so as to increase the colour uniformity in a suitable fashion.

In some embodiments, it is considered that the method that is selected is dependent upon the display arrangement that is used by the viewer. For example, in a VR context (that is, an embodiment in which a viewer uses an HMD for viewing the content) it may be particularly appropriate to preferentially perform the processing in peripheral regions. Such processing may have a smaller impact than if the equivalent processing were to be performed when a television is the display apparatus, for example.

In some embodiments, the application of such processes to a video (or a sequence of images) rather than a static image is considered. In introducing temporal dependencies, such as via inter-image encoding and compression, the gains in encoding efficiency may be improved and other advantages relating to the display of content may be obtained. For instance, flicker reduction in a video may be provided as an example of an effect that is not shared by still-image processing.

In those embodiments in which the temporal encoding is considered, image areas in which processing is performed to cause the colours to be made more uniform may be identified in dependence upon the content of one or more proceeding and/or following image frames. For instance, one or more features that are persistent within a video (that is, present for a significant number of image frames) may be more subjected to more aggressive colour uniformity processing than would otherwise be the case.

In general, the filters that are applied (that is, the colour uniformity increasing processing that is performed) may be classified as either 'static', or 'dynamic'. The first of these relates to filters that are applied to a selected screen area only—for example, only the borders of an image, or the far left/right edges of the image. The term 'dynamic' may be applied to those methods which are more content-dependent; that is, those in which processing is performed based upon neighbouring pixels and/or previous/future frames. Of course, a combination of these filter types may be used where appropriate.

The filters may be applied at any suitable time in dependence upon the filter and the content. For example, some filters (such as the static filters described above) may be appropriate for application to a completely rendered image prior to display. However, more dynamic filters may be more suited to being applied during the rendering process itself. For example, colours may be modified pre-rendering, and it may be easier to utilise context-specific information (such as game data) for determining how to apply the filter. Of course, a combination of these methods for applying filters may be used where appropriate.

As noted above, the compression of individual image frames and/or a sequence of image frames may be improved as a result of increasing the uniformity of colours within one or more image areas. This is because it may be possible to apply a compression technique to the content that generates more efficient representations of the content when the colour variations are reduced.

One example of such a compression technique is that of delta colour compression (DCC). DCC is a coding scheme in which blocks of pixels are processed together, rather than as individual pixels. A first pixel value is encoded for the block with full precision, with the colours of remaining pixels being stored as a delta with respect to this value. The data cost associated with storing the delta value is lower than that of the full value, thereby reducing the overall amount of data required for representing the image. In some embodiments, this may be applied on a per-image basis, while in others it is applied to the whole of a piece of video content. It should be apparent that such a coding scheme may provide both improved encoding efficiency for content, as well as a reduction in bandwidth required for image rendering or the like.

Therefore by making the colours within an image area more uniform, the encoding efficiency of an image may be improved. Advantages may be obtained from reducing the delta, rather than necessarily having to reduce it to zero—and as such the increase in the uniformity of the colours in an area does not have to render the pixel values within that area identical.

Other compression techniques may also be made more effective by such processing—for example, the Graphics Interchange Format (GIF) is an image encoding scheme that benefits from the use of larger areas of uniform colour. The efficiency of video encoding may also be improved as a result of the use of more uniform colour regions within an image.

Figure 5:
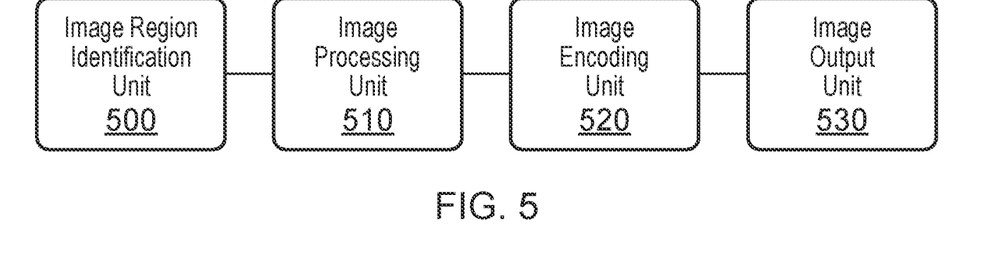
FIG. 5 schematically illustrates an image generating apparatus.

FIG. 5 schematically illustrates a system for generating image content, the system comprising an image region identification unit 500, an image processing unit 510, an image encoding unit 520, and an image output unit 530.

The image region identification unit 500 is operable to identify one or more regions of an image to be displayed as low-detail regions. As discussed above, this may relate to any region within the image and may be determined based upon contextual information, image position, location of objects within a virtual scene, user focus or interest, or any other suitable manner. The image to be displayed refers to an image to be rendered, or a rendered image—that is, the described processing may be applied as a post-processing step, as a rendering step, or both.

In some embodiments the image region identification unit 500 is operable to identify the one or more regions of the image to be displayed in dependence upon the location of one or more objects within the image to be displayed—that is, the regions are determined based upon a position defined in image or display coordinates. Alternatively, or in addition, the image region identification unit 500 may be operable to identify the one or more regions of the image to be displayed in dependence upon the location of one or more objects within the scene represented by the image to be displayed—that is, the regions are determined based upon a (two- or three-dimensional) position defined in virtual world coordinates.

A further alternative or additional implementation (which may be used instead of or as well as each or either of the previous features) is that in which the image region identification unit 500 is operable to identify the one or more regions of the image to be displayed in dependence upon their location relative to a predetermined position within the image to be displayed. In some embodiments, the predetermined position is the centre of the image or a point of user interest or focus (for example, as determined using gaze-tracking methods).

In some embodiments, the image region identification region 500 is operable to identify one or more regions of the image in dependence upon one or more preceding or following images to be displayed.

The image processing unit 510 is operable to perform processing to reduce colour differences for each of one or more areas within one or more of the identified regions. This processing may be performed in line with any of the methods described above, so long as the uniformity of colours within at least one region of the image is increased.

In some embodiments, the image processing unit 510 is operable to identify a representative colour for each of the one or more areas, and to modify the colours of one or more pixels within the area so as to be closer to the representative colour. By 'closer to the representative colour', it is meant that the colours are made more similar—such that the number of different shades of a colour in a region is reduced, or the shades are made more similar. Similarity may be measured in terms of deviation in RGB values, for instance. For example, the colours of one or more pixels may be modified such that the colour values have an equal to or less than threshold deviation from the representative colour.

The representative colour may be the average colour value of the area, or it may be a different value selected for that particular application (such as for colour grading or correction purposes, as discussed above).

The image encoding unit 520 is operable to encode the processed image data that is output by the image processing unit 510. In some embodiments the image encoding unit 520 is operable to utilise a delta colour compression algorithm when encoding the data, or any other suitable compression algorithms. This may include the encoding of individual images or image frames, or the generation of video content from input images or image frames.

The image output unit 530 is operable to output one or more processed images; this may include outputting the images to a display device for display to a viewer, and/or output to a storage medium for later playback.

The arrangement of FIG. 5 is an example of a processor (for example, a GPU and/or CPU located in a games console or any other computing device) that is operable to generate and process image content, and in particular is operable to:

identify one or more regions of an image to be displayed as low-detail regions;

perform processing to reduce colour differences for each of one or more areas within one or more of the identified regions; and output one or more processed images.

Figure 6:
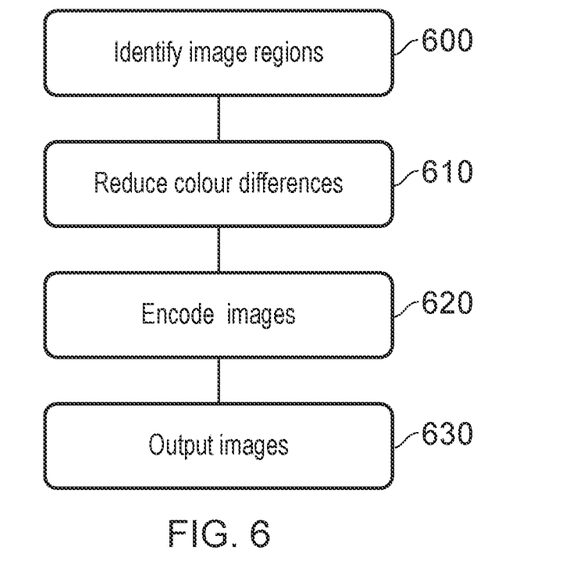
FIG. 6 schematically illustrates an image generating method.

FIG. 6 schematically illustrates a method for generating image content.

A step 600 comprises identifying one or more regions of an image to be displayed as low-detail regions.

A step 610 comprises performing processing to reduce colour differences for each of one or more areas within one or more of the identified regions.

A step 620 comprises encoding the processed image data generated in step 610.

A step 630 comprises outputting one or more processed images.

As described above, such a method may generate improved image content for display to a user while also reducing the amount of data that is required to store and/or transmit the image. Benefits to the appearance of the image content may be obtained via a reduction in the number of artefacts present in an image, and/or a flicker-reduction effect; these effects may be independent of any benefits obtained from an improved compression or encoding of the content.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The invention claimed is:

1. A system for generating image content, the system comprising:
   an image region identification unit operable to identify one or more regions of an image to be displayed as low-detail regions;
   an image processing unit operable to perform processing to reduce colour differences for each of one or more areas within one or more of the identified regions; and
   an image output unit operable to output one or more processed images, where the one or more processed images include each of the one or more areas having the reduced colour differences.

2. The system of claim 1, wherein the image region identification unit is operable to identify the one or more regions of the image to be displayed in dependence upon the location of one or more objects within the image to be displayed.

3. The system of claim 1, wherein the image region identification unit is operable to identify the one or more regions of the image to be displayed in dependence upon the location of one or more objects within the scene represented by the image to be displayed.

4. The system of claim 1, wherein the image region identification unit is operable to identify the one or more regions of the image to be displayed in dependence upon their location relative to a predetermined position within the image to be displayed.

5. The system of claim 4, wherein the predetermined position is the centre of the image or a point of user interest or focus.

6. The system of claim 1, wherein the image region identification region is operable to identify one or more regions of the image in dependence upon one or more preceding or following images to be displayed.

7. The system of claim 1, wherein the image to be displayed refers to an image to be rendered, or a rendered image.

8. The system of claim 1, wherein the image processing unit is operable to identify a representative colour for each of the one or more areas, and to modify the colours of one or more pixels within the area so as to be closer to the representative colour.

9. The system of claim 8, wherein the representative colour is the average colour value of the area.

10. The system of claim 8, wherein the colours of one or more pixels are modified such that the colour values have an equal to or less than threshold deviation from the representative colour.

11. The system of claim 10, comprising an image encoding unit operable to encode the processed image data.

12. The system of claim 11, wherein the image encoding unit is operable to utilise a delta colour compression algorithm.

13. A method for generating image content, the method comprising:
- identifying one or more regions of an image to be displayed as low-detail regions;
- performing processing to reduce colour differences for each of one or more areas within one or more of the identified regions; and
- outputting one or more processed images, where the one or more processed images include each of the one or more areas having the reduced colour differences.

14. A non-transitory machine-readable storage medium which stores computer software which, when executed by a computer, causes the computer to perform a method for generating image content, the method comprising:
- identifying one or more regions of an image to be displayed as low-detail regions;
- performing processing to reduce colour differences for each of one or more areas within one or more of the identified regions; and
- outputting one or more processed images, where the one or more processed images include each of the one or more areas having the reduced colour differences.

* * * * *